United States Patent
Arend et al.

(10) Patent No.: US 12,090,922 B2
(45) Date of Patent: Sep. 17, 2024

(54) DOOR LEAF COMPRISING A LIGHT PROFILE FOR A VEHICLE

(71) Applicant: BODE—DIE TÜR GMBH, Kassel (DE)

(72) Inventors: Ulrich Arend, Dickershausen (DE); Gerd Gläsel, Niestetal (DE); Abbas Rasekhi, Kassel (DE)

(73) Assignee: BODE—DIE TÜR GMBH, Kassel (DE)

( * ) Notice: Subject to any disclaimer, the term of this patent is extended or adjusted under 35 U.S.C. 154(b) by 0 days.

(21) Appl. No.: 17/769,121

(22) PCT Filed: Oct. 2, 2020

(86) PCT No.: PCT/EP2020/077689
§ 371 (c)(1),
(2) Date: Apr. 14, 2022

(87) PCT Pub. No.: WO2021/083611
PCT Pub. Date: May 6, 2021

(65) Prior Publication Data
US 2024/0109476 A1 Apr. 4, 2024

(30) Foreign Application Priority Data
Oct. 31, 2019 (DE) .................. 20 2019 106 056.5

(51) Int. Cl.
| | | |
|---|---|---|
| B60Q 3/217 | (2017.01) | |
| B60J 5/04 | (2006.01) | |
| B60Q 1/32 | (2006.01) | |
| B60Q 3/41 | (2017.01) | |
| B60Q 3/64 | (2017.01) | |
| B60Q 3/78 | (2017.01) | |
| B61D 29/00 | (2006.01) | |

(52) U.S. Cl.
CPC ............ *B60Q 3/217* (2017.02); *B60J 5/0495* (2013.01); *B60Q 1/324* (2022.05); *B60Q 3/41* (2017.02); *B60Q 3/64* (2017.02); *B60Q 3/78* (2017.02); *B61D 29/00* (2013.01)

(58) Field of Classification Search
CPC .......... B60Q 1/324; B60Q 3/217; B60Q 3/41; B60Q 3/64; B60Q 3/78; B60J 5/0495; B61D 29/00
See application file for complete search history.

(56) References Cited

U.S. PATENT DOCUMENTS

2019/0255923 A1* 8/2019 Salles .................. B61D 19/026

FOREIGN PATENT DOCUMENTS

| CN | 205805392 U | 12/2016 |
|---|---|---|
| DE | 102006011108 A1 | 9/2007 |

(Continued)

OTHER PUBLICATIONS

International Search Report issued Dec. 8, 2020 re: Application No. PCT/EP2020/077689, pp. 1-2, citing: DE 102006011108 A1, EP 3409557 A1, FR 3055348 A1, EP 3121362 A1 and US 20190255923 A1.

*Primary Examiner* — Anne M Hines
*Assistant Examiner* — Jose M Diaz
(74) *Attorney, Agent, or Firm* — CANTOR COLBURN LLP

(57) ABSTRACT

A door leaf, in particular for motor vehicles and rail vehicles, door leaf includes a main closing edge, wherein a light source is located on the main closing edge. A light profile is located on the main closing edge and is designed to guide and scatter a light emission from the light source.

11 Claims, 2 Drawing Sheets

(56) References Cited

FOREIGN PATENT DOCUMENTS

| | | |
|---|---|---|
| DE | 202015104364 U1 | 11/2015 |
| DE | 102016219904 A1 | 4/2018 |
| EP | 3121362 A1 | 1/2017 |
| EP | 3409557 A1 | 12/2018 |
| FR | 3055348 A1 | 3/2018 |
| WO | 2018069489 A1 | 4/2018 |

* cited by examiner

DOOR LEAF COMPRISING A LIGHT PROFILE FOR A VEHICLE

TECHNICAL FIELD

The present disclosure relates to a door leaf, particularly for motor vehicles and rail vehicles, having a primary closing edge, wherein a light source and a light profile are disposed thereon and configured for conducting and scattering a light emission of the light source.

BACKGROUND

Entrance systems of motor vehicles and rail vehicles include one or two door leaves that can close off an entrance area of a bus or a train via a sliding, pivoting or sliding-and-pivoting movement.

For example, the door leaves may be all-glass door leaves or have a sandwich design with an aluminum cover plate. Moreover, the door leaves have a primary closing edge that extends over the entire height of the door leaf and is disposed parallel to the y-axis. When the door leaves close off the entrance area, their primary closing edges touch. Thus, the front edge of the door leaf in the closing direction is the primary closing edge. This applies also in the case of entrance areas closed off by one door leaf. The side opposite the primary closing edge in each case is referred to as the secondary closing edge. For a better understanding, the width of the door leaf is defined in the direction of the x-axis in an orthogonal coordinate system. The height of the door leaf extends in the direction of the y-axis, and the thickness of the door leaf in the direction of the z-axis.

Generally, a rubber finger guard is provided along the main closing edge, which is made from an elastic material that yields if a hand is caught in the door, for example, whereby injuries are avoided. In addition, safety devices may be provided in the rubber finger guard, such as pressure sensors, for instance, which are capable of registering an increase in pressure. If an increase in pressure is registered, the entrance area is immediately opened again, or the closing movement is interrupted.

An exemplary operational state of the entrance area is the closing movement of the door leaves. This operational state may be indicated to the passenger via a visual and/or acoustic notification. Generally, a warning tone sounds before and while the entrance area is closed by the door leaves, which may be accompanied by a flashing or continuously lit light source. The light source may be provided above the door on an inner and/or outer side of the bus or train. However, this position of the light source is disadvantageous in that it is not readily perceived by a passenger standing directly in front of the door. That is the reason why the light source is frequently inserted into the surface of the door leaf, however, the design of the latter has to be altered to a significant extent for this purpose.

Another solution provides that the rubber finger guard is made from an uncolored silicone. A light source is disposed on the end face of the door leaf arranged along the y-axis, in the area of the primary closing edge. The rubber finger guard conducts and scatters the light emission towards the observer. Since the rubber finger guard is disposed in the entrance area, it may become soiled due to bags hitting the rubber finger guard, or by passengers leaning against it, for example. A rough surface of the silicone may exacerbate this effect. Therefore, this solution is disadvantageous in that the silicone becoming soiled may reduce the visibility of the light emission.

In the case of all-glass door leaves, the door is formed by a metal frame with glass panes. Due to the large glass front, electrical lines can only be incorporated in the area of the metal frame. Since all-glass door leaves, unlike sandwich door leaves, do not have any cover plate, the integration of additional modules, such as light sources or sensors, is made more difficult and is also mostly limited to the area of the metal frame.

SUMMARY

The object of the present disclosure to be achieved lies in making the integration of a light source into a door leaf less complicated and more cost-effective. Moreover, the notification is supposed to be easily visible for the passenger.

The above-mentioned object is achieved by a modular door leaf having the features of patent claim 1. Advantageous further developments are the subject matter of the dependent claims.

A modular door leaf according to the disclosure, particularly for motor vehicles and rail vehicles, comprises a primary closing edge, wherein a light source is disposed on the primary closing edge. The door leaf is characterized by a light profile, which is disposed on the primary closing edge and configured for conducting and scattering the light emission of the light source.

The door leaf closes off the entrance area of a bus or a train via a sliding, pivoting or sliding-and-pivoting movement. Generally, the door leaf is rectangular, with the primary closing edge being disposed on a long side. A light-transmissive light profile and a light source, preferably a RGB(W) LED, are disposed on the end face of the door leaf, in the area of the primary closing edge. Light-emitting diodes (LED) lamps or LED strips have a low power consumption while exhibiting a long life and small maintenance expenditure. At the same time, due to their flexible structure, they can be mounted on more complex geometric shapes, such as on door leaves with a crowning.

The light source is mounted on the door leaf and radiates into the light profile in the x-direction. The light profile serves as a light guide and scattering body, whereby the light emission is uniformly guided in all directions. Thus, a single light source is no longer separately visible.

The passenger is able to perceive the light emission that is guided towards the outside and recognize an operational state of the entrance area. Depending on the operational state, the light source may flash or shine continuously. Both the passenger located within the vehicle and the passenger located outside the bus or train are able to see the light emission. Alternatively, it is also possible that the light emission shines only into the interior of the vehicle or towards the outside. For example, it is possible that the illumination of the light profile indicates to the passenger on the platform which cars are heavily occupied and which are not, so that the passenger, while still on the platform, is able to turn towards the less occupied cars while the train is still pulling into the train station.

It is another alternative possibility that two light sources separated from each other by an intermediate layer are disposed in the light profile. Thus, for example, one light source may shine only into the vehicle interior, with the other light source being able only to shine towards the outside of the vehicle, whereby it can only be perceived by the passengers outside the vehicle. This solution is advantageous in that the passenger flows from the vehicle and into the vehicle can be controlled by a two-color illumination of the light sources, for example with the colors green and red.

The geometric shape of the light profile can be adapted to the individual wishes of the customers independently of the door leaf, and made wider or narrower, for example. In order to integrate the light profile into the door leaf, only the design of the end face of the door leaf in the area of the primary closing edge has to be adapted. Thus, the door leaf according to the disclosure is also suitable for door leaves with a crowning.

Advantageously, a rubber finger guard is disposed on the light profile on the side facing away from the door leaf. The rubber finger guard is made from an elastic material, preferably silicone.

Advantageously, the light profile extends over the entire height of the primary closing edge, whereby the light emission is readily visible to the passenger. Moreover, an illuminated light profile may also be disposed on the secondary closing edge, by the design of the door leaf on the secondary closing edge being reduced by the width of the light profile. The light profile is arranged on the door leaf in the same manner as on the primary closing edge and may extend over the entire height of the secondary closing edge.

Preferably, the door leaf has a door leaf groove. In this case, the door leaf groove is disposed on the end face of the door leaf in the area of the primary closing edge. The light profile is secured in the door leaf groove and locked in place by door leaf offsets, which are aligned in the z-direction and make the groove narrower at the end in the x-direction. When mounting the door leaf, the light profile is pushed into the door leaf groove and only has to be additionally locked in place in the y-direction. Thus, assembly times and costs are reduced. In addition, the light profile may be glued or screwed or similarly secured to the door leaf.

It is particularly advantageous if the light source is disposed on a groove bottom of the door leaf groove. For maintenance work, the light source is accessible and detachable with little effort after the light profile has been removed from the door leaf groove. The light source may be attached to the groove bottom by gluing, via a screwed connection or a comparable connection, for example. Detachable connections are advantageous in that the light source may be readily replaced in case of malfunction. In the door leaf groove, the light source is protected against external influences, such as moisture, or mechanical stresses, such as impacts.

According to a first advantageous embodiment of the door leaf, the light profile forms a first light profile groove and a second light profile groove, wherein the shape of the first light profile groove is adapted to the shape of the light source. Thus, a compact design of the light profile is possible.

In another preferred embodiment of the door leaf, walls of the first light profile groove form at their ends first light profile offsets directed towards one another, so that the light source is kept spaced apart from the groove bottom in the first light profile groove. Thus, the light source is locked in place in the x-direction and does not have to be screw-connected or glued additionally. Only a lock in the y-direction is necessary. The effort for assembly and maintenance is thus significantly reduced.

Advantageously, the door leaf may be configured in such a way that walls of the second light profile groove have at their ends second light profile offsets directed towards one another, which are provided for locking the rubber finger guard in place in the x-direction. Also in this case, only a lock of the rubber finger guard in the y-direction is necessary. This lock may be a detachable connection which may be effected at the lower edge of the door leaf, for example, which also achieves a reduction of the assembly and maintenance effort.

Due to the light source, the light profile and the rubber finger guard being held in grooves, these components may also be removed as an assembly from the door leaf, which also reduces the maintenance effort.

According to another advantageous embodiment of the door leaf, an intransparent layer is disposed within the second light profile groove between the light profile and the rubber finger guard. The intransparent layer prevents the rubber finger guard from being visible through the light profile. Preferably, the intransparent layer has on its side facing towards the light profile a reflective surface, which reflects the light emission of the light source and redirects it towards the observer.

The door leaf may also be characterized in that the light profile is made from a plastic.

Advantageously, the door leaf, the light profile and the rubber finger guard have a uniform thickness in the z-direction and are aligned.

BRIEF DESCRIPTION OF THE DRAWINGS

Other advantageous embodiments of the present disclosure become apparent from the following description with reference to the Figures. The Figures merely show exemplary embodiments and are not to be understood as limiting. In the Figures

DETAILED DESCRIPTION OF THE DRAWINGS

For a better understanding, an orthogonal coordinate system with an x-axis, a y-axis and a z-axis is shown in the Figures. In this case, the x-axis extends along a width of a door leaf 20, the y-axis along a long side (height) of the door leaf 20, and the z-axis along the depth of the door leaf.

Figure 1:
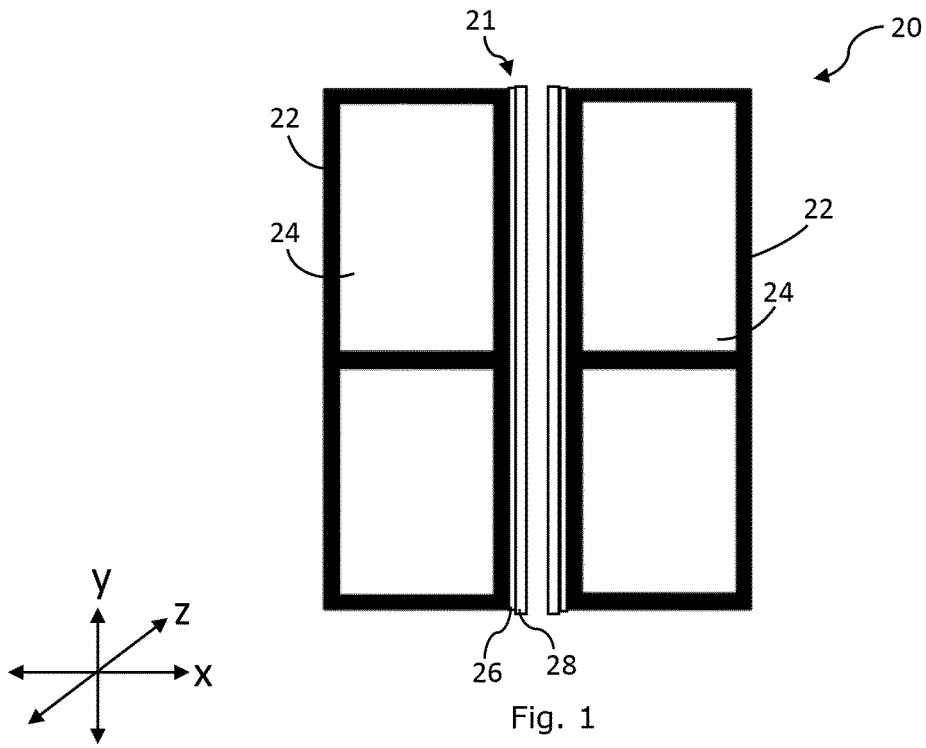
FIG. 1 shows a schematic representation of two all-glass door leaves.

FIG. 1 shows a schematic representation of door leaves 20 with an all-glass construction. The door leaves 20 are configured for closing off an entrance area of a bus or a train, for example. A door leaf 20 has a rectangular frame 22 into which two large-surface glass panes 24 are inserted in the depicted exemplary embodiment. For example, the frame 22 may be made from a metallic material, such as aluminum, or also from a fiber composite material.

The front edge of the door leaf 20 in the closing direction is referred to as the primary closing edge 21. Thus, the primary closing edge 21 extends along the y-axis and over the entire height of the door leaf 20. A light profile 26 is disposed on the primary closing edge 21. Preferably, the light profile 26 is made from a diffuse plastic material. Moreover, a light source 30, whose light emission radiates into the light profile 26, is disposed on the primary closing edge 21 (see FIGS. 2 to 4). The light emission may be conducted in the z-direction towards the inside into the vehicle interior and towards the outside. Thus, an observer located in the vehicle interior can perceive the light emission, as can an observer located outside the vehicle. Alternatively, it is also possible that the light emission is conducted only into the interior of the vehicle or only towards the outside.

The light source 30 is an RGB(W) LED, for instance. The LED may shine continuously or flash, optionally also in different colors. It is also possible that the light source flashes at different frequencies, or that the light emission has a frequency change while flashing. In particular, the light source 30 is provided for visually depicting an operational state of the entrance area. For example, a light source 30 shining or flashing in red may signal a closing process or a state of remaining closed or a locking of the entrance area. In contrast, a light source 30 shining or flashing in green may signal an opening process or a state of remaining open of the entrance area.

In the exemplary embodiment shown, a rubber finger guard 28, which is made from silicone, for example, is attached to the light profile 26 on the side facing away from the door leaf 20. Moreover, an electrical switching strip, which is not shown in the Figures, may be integrated into the rubber finger guard 28.

Figure 2:
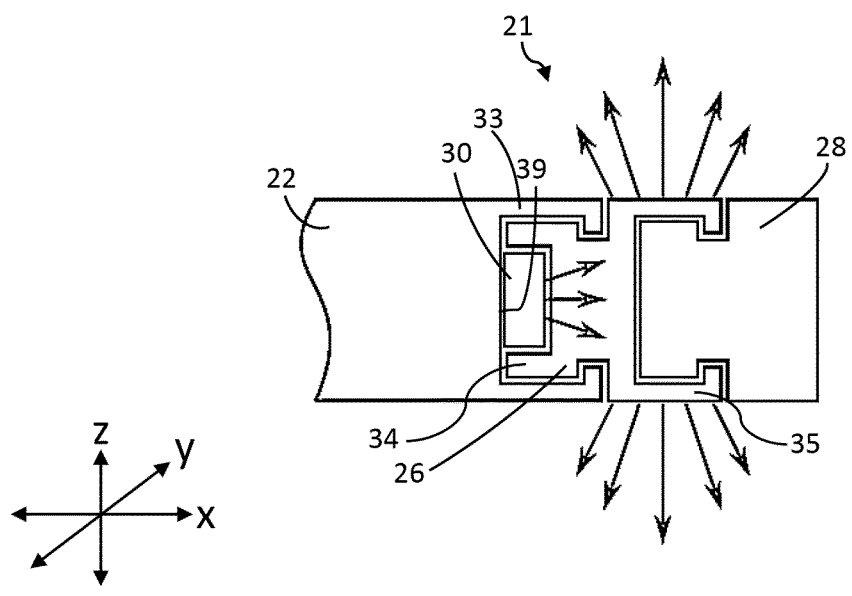
FIG. 2 shows a schematic representation of a partial area of a cross-section of a primary closing edge of a first exemplary embodiment.
Figure 3:
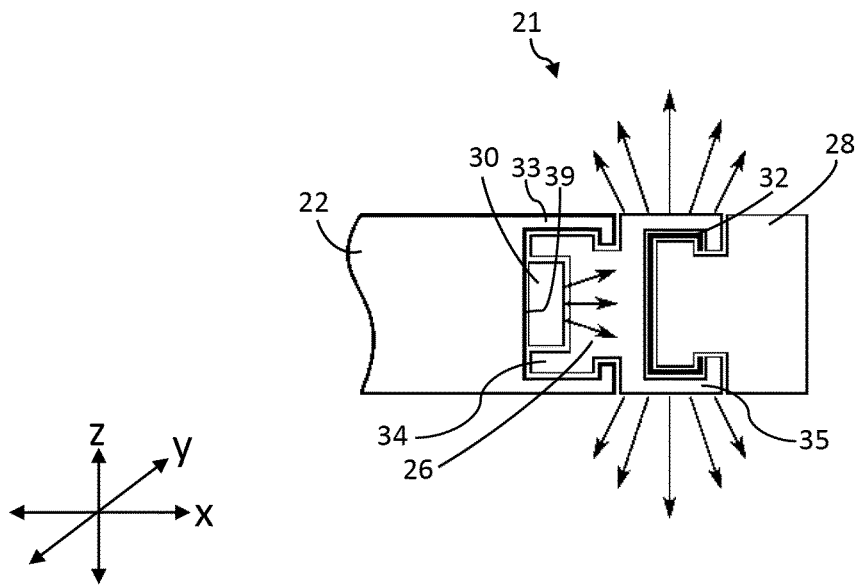
FIG. 3 shows a schematic representation of a partial area of the cross-section of a primary closing edge of a second exemplary embodiment.
Figure 4:
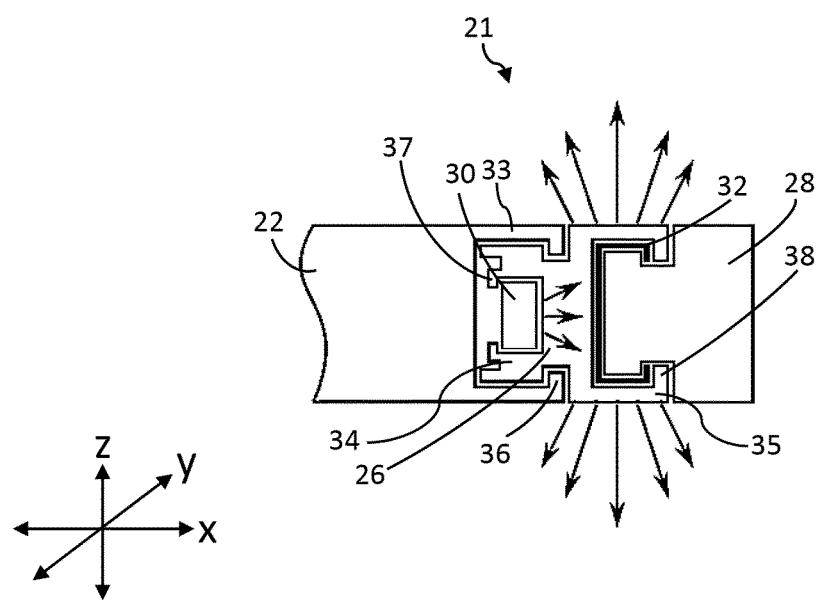
FIG. 4 shows a schematic representation of a partial area of the cross-section of a primary closing edge of a third exemplary embodiment.

FIGS. 2 to 4 show three different preferred exemplary embodiments for a design of a cross-sectional profile of the door leaf 20 in the area of the primary closing edge 21.

The door leaf 20 has a door leaf groove 33 on the end face in the area of the primary closing edge 21. The door leaf groove 33 has at the end thereof, on the walls extending along the x-axis, two door leaf offsets 36 in each case, which are arranged along the z-direction and directed towards each other. The light source 30 is disposed in this door leaf groove 33 and, in the embodiment according to the FIGS. 2 and 3, disposed on the door leaf 20, i.e. on the groove bottom 39. The light profile 26, which is locked in place in the x-direction due to the door leaf offsets 36, is also retained in the door leaf groove 33.

In cross-section, the light profile 26 forms a first light profile groove 34 and a second light profile groove 35. The first light profile groove 34 is disposed within the door leaf groove 33, wherein the shape of the first light profile groove 34 corresponds to the shape of the light source 30. The second light profile groove 35 is arranged opposite the first light profile groove 34 and has second light profile offset 38 that point towards each other. The rubber finger guard 28 is disposed in the second light profile groove 35 and protrudes from it. The second light profile offsets 38 lock the rubber finger guard 28 in place in the x-direction. The door leaf 20, the light profile 26 and the rubber finger guard 28 have a uniform thickness (in the z-direction), whereby these components are aligned in the x-direction.

FIG. 3 shows a second preferred exemplary embodiment, which has all the features of the first exemplary embodiment. Moreover, it has an intransparent layer 32 within the second light profile groove between the light profile 26 and the rubber finger guard 28. Due to the intransparent layer 32, the rubber finger guard 28 is not visible through the light profile 26 for the observer. Further, the intransparent layer 32 may have a reflective surface, which reflects the light emission of the light source 30 and/or redirects it in the direction of the observer.

FIG. 4 shows another preferred exemplary embodiment, which has almost all the features of the second exemplary embodiment. What is different, however, is that the light source 30 is not arranged on the groove bottom 39 of the door leaf groove 33 but retained in the first light profile groove 34, and thus arranged spaced apart from the groove bottom 39. For this purpose, the first light profile groove 34 has first light profile offsets 37, which point towards one another and which retain the light source 30 in the first light profile groove 34 and lock it into place along the x-axis.

For assembling the door leaf 20, the individual components 26, 28, 30 may be pushed along the y-axis into the respective corresponding grooves 33, 34, 35. The door leaf 20, the light source 30, the light profile 26 and the rubber finger guard 28 may be locked into place in the y-direction by screwing or gluing the individual components together, for example.

The invention claimed is:

1. A door leaf, for motor vehicles and rail vehicles, comprising a primary closing edge, wherein a light source is disposed on the primary closing edge wherein a light profile is disposed on the primary closing edge and configured for conducting and scattering a light emission of the light source, wherein the light profile forms a first light profile groove and a second light profile groove, and wherein the shape of the first light profile groove is adapted to the shape of the light source such that the light source is disposed therein.

2. The door leaf according to claim 1, wherein a rubber finger guard is disposed on the light profile on a side of the light profile opposite the door leaf.

3. The door leaf according to claim 1, wherein the light profile extends over an entire height of the primary closing edge.

4. The door leaf according to claim 1, wherein a door leaf groove having door leaf offsets directed towards one another and provided for locking the light profile in place in the x-direction, is inserted into the primary closing edge.

5. The door leaf according to claim 4, wherein the light source is disposed on a groove bottom in the door leaf groove.

6. The door leaf according to claim 1, wherein walls of the first light profile groove form at their ends first light profile offsets directed towards one another, such that the light source is kept spaced apart from the groove bottom by the first light profile groove.

7. The door leaf according to claim 2, wherein walls of the second light profile groove have at their ends second light profile offsets directed towards one another, which are provided for locking the rubber finger guard in place in the x-direction.

8. The door leaf according to claim 2, wherein an intransparent layer, which prevents the rubber finger guard from being visible through the light profile, is disposed between the light profile and the rubber finger guard.

9. The door leaf according to claim 8, wherein the intransparent layer has a reflective surface configured to reflect the light emission of the light source and redirect the light emission towards the observer.

10. The door leaf according to claim 1, wherein the light profile is made from a diffuse plastic.

11. The door leaf according to claim 1, wherein the door leaf, the light profile, and the rubber finger guard have a uniform thickness in the z-direction and are aligned.

* * * * *